United States Patent [19]

Booher

[11] 3,711,163
[45] Jan. 16, 1973

[54] AUTOMATIC BRAKING SYSTEM

[75] Inventor: Harold R. Booher, Youngstown, Ohio

[73] Assignee: The Goodyear Tire & Rubber Company, Akron, Ohio

[22] Filed: Sept. 30, 1970

[21] Appl. No.: 76,904

[52] U.S. Cl. .................... 303/21 P, 244/111, 303/20
[51] Int. Cl. ................................................ B60t 8/12
[58] Field of Search ..... 188/181 A; 244/111; 303/20, 303/21; 324/162; 340/262

[56] References Cited

UNITED STATES PATENTS

| | | | |
|---|---|---|---|
| 3,537,758 | 11/1970 | Buhler et al. | 303/21 BE |
| 3,494,671 | 2/1970 | Slavin et al. | 303/21 P |
| 3,520,575 | 7/1970 | Steigerwald | 303/21 BE |
| 3,554,612 | 1/1971 | Harned | 303/21 BE |
| 3,275,384 | 9/1966 | Hirzel | 303/21 CG |
| 3,017,145 | 1/1962 | Yarber | 303/21 P |
| 3,556,610 | 1/1971 | Leiber | 303/21 P |

FOREIGN PATENTS OR APPLICATIONS 1,956,398   5/1970   Germany............................303/21 P

*Primary Examiner*—Trygve M. Blix
*Assistant Examiner*—Stephen G. Kunin
*Attorney*—F. W. Brunner, P. E. Milliken and Oldham and Oldham

[57] ABSTRACT

A brake control system for automatically providing a smooth, comfortable brake pressure application rate for achieving the desired deceleration level and for maintaining this level. The system consists essentially of a closed looped modulator which controls the brake valve. The modulator is responsive to a brake-apply signal to produce the desired deceleration rate. The system is also responsive to a brake-remove signal to produce smooth and comfortable removal of the brake application and the system is capable of being instantly overridden to return full braking control to the vehicle operator.

10 Claims, 3 Drawing Figures

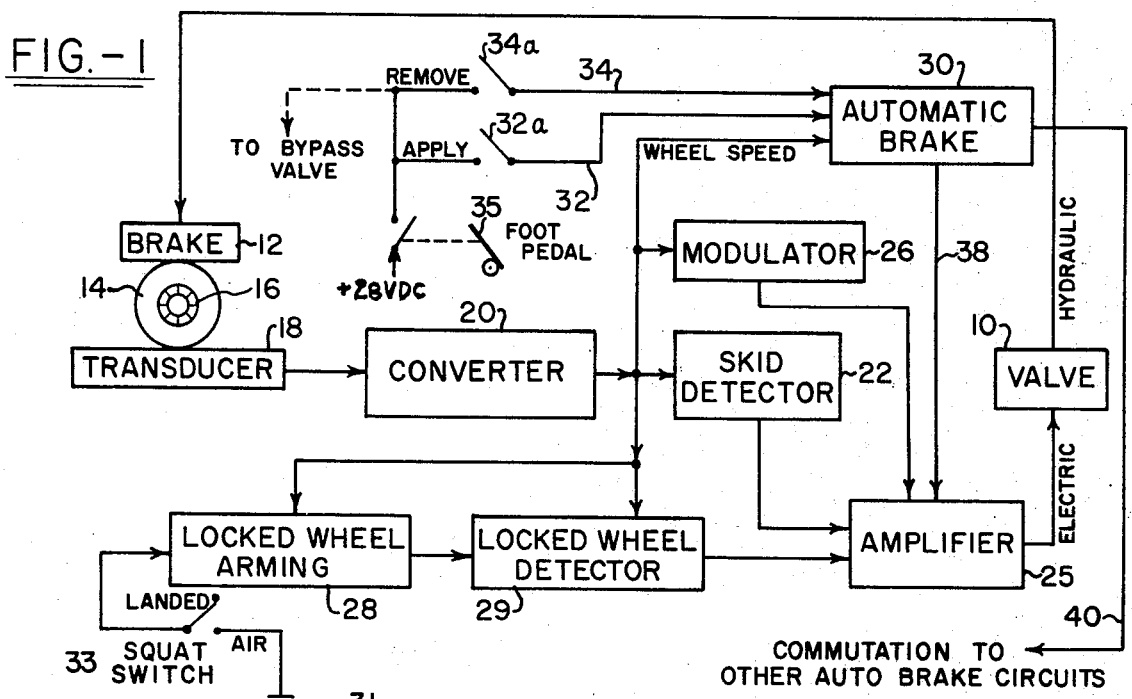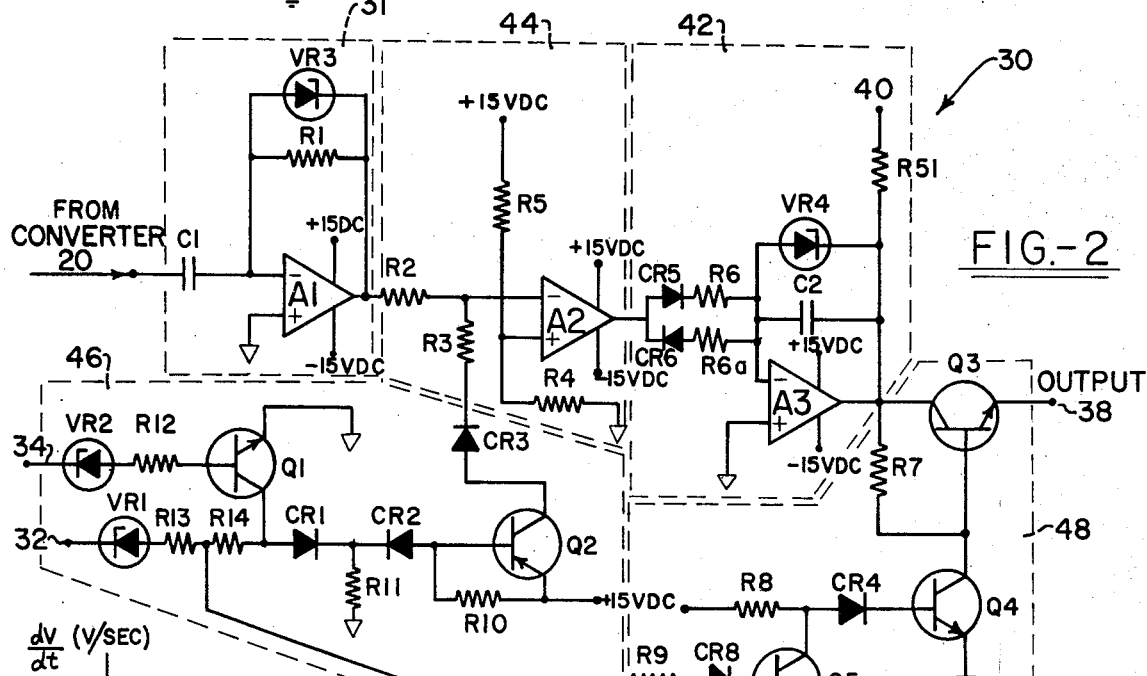

AUTOMATIC BRAKING SYSTEM

This invention relates to a brake controlling circuit which controls the brakes to provide a smooth and comfortable brake pressure application rate to achieve a desired deceleration level and to maintain that level.

It is desirable that the braking rate of a passenger vehicle be smooth and comfortable, particularly in commercial passenger aircraft where passenger comfort and safety is an important factor. It is also desirable that the braking action of the vehicle be consistent so that a predictable stopping distance be obtained. While normally the braking rate is directly controlled by the vehicle operator, subject to anti-skid control circuits, a more uniform and predictable braking rate can be achieved by means of an automatic circuit. Any brake control system must be capable of being overridden by the vehicle operator when the situation requires.

It is the primary object of the present invention to provide a brake control circuit which is capable of controlling the brakes so as to provide a smooth and comfortable deceleration of the vehicle. It is also the object of the invention to provide a brake control circuit which provides consistent braking action to maintain a predictable stopping distance. Another object of the invention is to provide a brake control circuit which may be overridden by the vehicle operator to return braking control to him depending upon the requirements of the situation. Another object of the invention is the provision of a brake control system which is capable of smoothly and comfortably releasing the braking action of the vehicle upon command by the vehicle operator.

As will be pointed out more fully below, the present invention achieves these objectives by providing a brake control system which includes a closed loop modulator to smoothly bring the braking action to a desired deceleration level and to maintain the action at that level.

The above and other objects and advantages of the invention will become apparent upon consideration of the following specification and the accompanying drawing wherein there is shown a preferred embodiment of the invention.

In the drawing:

FIG. 1 is a block diagram of a complete brake control system employing the automatic brake controlling circuit of the present invention;

FIG. 2 is a schematic showing of a preferred embodiment of the specific automatic brake control circuitry; and FIG. 3 is a graph showing the desired operating curve for a vehicle braking system.

As shown in FIG. 1, the brake control system includes a valve 10 which controls the application of pressure to the brake 12 associated with a vehicle wheel 14. An exciter ring 16 is mounted for rotation with the wheel 14. Associated with the exciter ring 16 is a transducer 18 located at the end of the axle and this combination constitutes a wheel-speed sensor. The electrical pulses generated by the transducer 18 are sent to a converter which produces a D.C. voltage directly proportional to the wheel speed. The wheel speed dependent signal from the converter 20 is supplied to a skid detector circuit 22 which sends a control signal to amplifier 25. The signal from converter 20 is sent to a modulator 26. The signal is also supplied to a locked wheel arming circuit 28 and a locked wheel detecting circuit 29 which also controls the amplifier 25. The output signal of the amplifier 25 controls the operation of the valve 10. The control system described above may be of the type described in application Ser. No. 593,150, abandoned in favor of continuation-in-part application, Ser. No. 871,512, filed Oct. 27, 1969, now U.S. Pat. No. 3,574,426 and operates to reduce brake pressure in the event of a sudden decrease in wheel speed which occurs during a skid and to smoothly reapply brake pressure thereafter.

The automatic brake control feature of the present invention is achieved by a circuit 30 which produces an additional control signal to the amplifier 25. The brake control circuit is responsive to vehicle operator initiated brake APPLY and brake REMOVE signals and to the wheel speed dependent voltage signal from the converter 20. Upon receipt of a brake APPLY signal in conductor 32 the automatic brake circuit produces a signal in the conductor 38 to the valve amplifier circuit 25. This signal causes the brake valve 10 to be operated so as to apply the brakes to smoothly achieve a comfortable deceleration rate and to maintain the rate once achieved.

The automatic brake control circuit 30 is shown in detail in FIG. 2. The circuit consists essentially of the following component sections:

1. A closed loop pressure control modulator indicated as a whole by dotted block 42 and consisting of an integrating amplifier A3, resistor R6, capacitor C2, and zener diode VR4.

2. A deceleration comparator section indicated generally by dotted block 44 which senses any deceleration error and provides an input to the pressure control modulator section 42 to effect a smooth and steady change in brake torque.

3. A gate section indicated generally by dotted block 48 which is controlled by the apply/remove logic section 46 and either passes or prevents passage of the control signal from the modulator section 42 to the amplifier 25 controlling the valve 10.

4. An automatic brake control logic section indicated generally by dotted block 46 which serves to control the APPLY and REMOVE signals to the gate 48.

5. A deceleration detector section indicated by dotted block 31 which detects deceleration rate from the signal received from converter 20.

The automatic braking mode is selected by the pilot or vehicle operator prior to landing by closing the arming switch 32a associated with line 32. This arms the automatic brake controlled logic section 46 which supplies APPLY and REMOVE signals over lines 32 and 34 at the proper time. Also, it may energize a solenoid operated valve (not shown) which bypasses the pilot operated power brake metering valve (not shown) so as to apply hydraulic system pressure to the inlet of the anti-skid valve 10. These valve relationships are well known and standard in the anti-skid field. In this manner, the brake pressure is controlled solely by the anti-skid valve 10 which receives commands through amplifier 25 from the skid detector 22 and automatic brake circuit 30.

The automatic brake control logic section 46 senses aircraft touch-down by monitoring the position of the squat switch 33. Upon landing, the automatic brake control logic 46 transmits the APPLY signal to the gate section 48. The result is that a command is applied from the circuit 30 resulting in brake pressure being applied at a smooth even rate until a predetermined deceleration level is attained. The automatic control circuit 30 maintains this level until (1) the aircraft is stopped (2) a remove signal is received from the automatic brake control logic 46 or (3) the pilot assumes control by depressing his brake peddle 35 which acts through the logic section 46.

If prior to a complete stop, the pilot chooses to taxi, he can close the remove switch 34a which sends a remove signal over line 34 to the automatic brake circuit 30. Upon receipt of the remove signal, the circuit 30 commands the anti-skid control valve 10 to remove brake pressure at a smooth, even rate.

If, during an automatic stop, the pilot finds it necessary to assume control of the braking effort, he can do so merely by depressing the brake pedal 35. This opens the brake pedal interlock switch 37 causing the automatic logic section 46 to terminate the APPLY signal. Loss of the APPLY signal causes immediate removal of the automatic brake control signal to the anti-skid valve 10. At the same time the normal hydraulic braking system of the aircraft is actuated.

FIG. 3 illustrates in graphic form the normal braking deceleration in feet per second squared as related to valve volts per second, with this being indicated by the curve 100 in solid line. The curve achieved by the automatic brake section 30 will follow the dotted line graph 102.

The essence of the automatic brake circuit as depicted by the graph of FIG. 3 is to maintain a steady deceleration rate of about 10 feet per second squared, or any predetermined rate desired, unless prohibited by poor runway conditions. Normally, the circuit of sections 42 and 44 described more fully hereinafter will maintain that deceleration intersected by the vertical portion of curve 102 by causing the valve voltage to change in either a positive (+) or negative (−) direction at the rate indicated by the horizontal sections of curve 102. This results in a rate of brake pressure change (psi/sec) in the direction necessary to maintain deceleration at the valve intersected on the abscissa by the vertical portion of curve 102. The maximum rates of valve voltage change are −3 v/sec and +7 v/sec. These limits are arbitrary however, depending on the valve electrical characteristics and the physical requirements and limitation of the structure.

The predetermined deceleration rate of 10 feet per second squared is maintained by the interaction of sections 31, 42, and 44. The electrical signal received from A1 is the deceleration rate of wheel 14. This signal applied through R2 to the negative input of A2. The predetermined operating level of A2 is controlled by a predetermined input reference voltage level to the positive terminal of A2. This reference voltage level is set by the voltage divider network R4 and R5. A2 is an amplifier that produces an output at all times of either positive or negative 15 VDC depending on the relation of the input voltage from A1 as it falls above or below the reference voltage level. When below the reference level, a +15 VDC signal is sent to A3 and when above the reference level a −15 VDC signal is sent to A3.

The integrator 42 generates a correction signal to maintain the desired 10 ft/sec$^2$ deceleration rate. The signal is built up or down at a rate determined by the electrical characteristics of resistors R6 and R6a acting in combination with capacitor C2. The rate is that indicated by the horizontal sections of curve 102, ie, 7 v/sec up and 3 v/sec down. R6 in combination with diode CR5 controls the down rate of −3 volts per second valve actuation energy for the example described, while R6a in combination with CR6 sets the up rate of +7 volts per second valve actuation energy. Valve voltage cannot rise above 10 VDC nor fall below 0 VDC. Q3 acts as a series switch that applies the output of A3 to amplifier 25 via conductor 38 only when an APPLY signal is received from logic section 46. VR4 acts to limit the maximum output from A3 by breaking down at a predetermined voltage. Hence, it is seen how the graph of FIG. 3 is attained as the deceleration rate of 10 ft./sec$^2$ limits up and down vertical portion of the graph to seek the proper voltage output to the valve 10.

SPECIFIC CIRCUIT DESCRIPTION

The deceleration detector 31 detects the instantaneous deceleration of the wheel so as to produce a DC level at its output that is proportional to the deceleration. This is accomplished by differentiating the wheel speed. C1, R1, and A1 form a classic differentiator with the ratio of C1 to R1 controlling the gain and with VR3 limiting the maximum output swing to prevent amplifier A1 from saturating. The deceleration information from the deceleration detector 31 is then sent to the deceleration comparator section 44 formed by amplifier A2 and resistors R2 through R5. The deceleration comparator section 44 compares the wheel deceleration with a preset reference deceleration and decides whether the wheel deceleration is too high or too low. If it is too high, the output of A2 switches to its low state. R4 and R5 form a voltage divider to provide the reference deceleration signal.

The output of the deceleration comparator section 44 is applied to the input of the pressure control modulator section 42. The modulator integrates the signal received from the deceleration comparator circuit 44 so as to provide steadily increasing or decreasing control signals at its output that, when applied to the anti-skid pressure control valve, will produce a smooth and steady change in brake torque in the direction to eliminate the deceleration error being sensed by the deceleration comparator section 44.

The gate section 48 formed by Q3 through Q5, CR4, and R7 through R9 acts as a series switch at the output of the pressure control modulator section 42. It is controlled by the apply/remove logic section 46 and is either on or off, that is it either passes or prevents passage of the pressure control signal from the modulator section 42 to the valve amplifier 10 through the conductor 38. Q3 and R7 form the actual switch and are controlled by Q4 and Q5. When neither an APPLY nor a REMOVE signal are present, Q4 is held in conduction by R8 and CR4 and effectively shorts to ground the base drive for Q3 thus holding switch Q3 in an open or off position. Also at this time, Q2 is held in conduction through CR2 and R11 and provides plus 15 VDC bias, (through R3) to the deceleration comparator section 44. The effect of the bias is to hold A2 at a low state despite the deceleration voltage appearing on R2. When A2 is in a low state the modulator section 42 is held at its zero brake pressure level until the bias voltage disappears. This occurs when the APPLY signal activates logic section 46. For this to happen, apply switch 32a must be closed and the squat switch 33 must be in landed position. The signal in conductor 32 blocks conduction of Q2 which removes the bias voltage from the deceleration comparator section 44 and permits it and the modulator section 42 to function normally. The signal in conductor 32 also causes Q5 to conduct which shuts down Q4 so as to permit Q3 to switch to a closed or on state thus connecting the outputs of the modulator section 42 to the valve amplifier circuit 25 through the conductor 38.

The result of the above sequence is to fully dump brake pressure at the instant of airplane touchdown and to immediately begin reapplying pressure at a smooth and steady rate. Pressure increases until the wheel deceleration, as sensed through the deceleration detector 31, exceeds the reference deceleration as determined by R4 and R5.

When a REMOVE signal appears in conductor 34, assuming that the APPLY signal is present in the conductor 32, Q1 is biased on and shorts to ground the portion of the APPLY signal that has blocked conduction of Q2 and thus causes the bias signal to reappear in the comparator section 44. With the bias signal present, the deceleration comparator section 44 is held in its low state thus producing a command to the control modulator section 42 to reduce brake pressure to zero at a smooth and steady rate.

If at any time the APPLY signal is removed from the conductor 32, even if the REMOVE signal is present in the conductor 34, Q5 and Q4 immediately switch Q3 to the open or off state removing the output signal of the pressure control modulator 42 from the valve amplifier 25 so as to return full braking control to the operator and the normal anti-skid circuits.

Preferably, the automatic brake control system of FIG. 2 is connected to provide simultaneous control of two wheels paired symmetrically opposite each other by connecting the valve amplifier 25 of each wheel to the output conductor 38 of the automatic brake control system.

Identical circuits control other wheels similarly paired. In order to prevent system "lock out" ie., one pair of wheels doing all of the work while the other pair coast, the automatic brake control circuits are interconnected through R51 and conductor 40.

While in accordance with the Patent Statutes only one preferred embodiment of the invention has been described, it will be understood that the invention is not so limited and that reference should be had to the appended claims in determining the scope of the invention.

What is claimed is:

1. A brake control system for use on a moving vehicle having at least one rotatable wheel, brake means for the wheel, means to represent wheel rotation as a voltage, and valve means responsive to an electrical signal for controllably actuating the brake means, comprising:
   an integrating amplifier for supplying the electrical signal to the valve means;
   a first circuit means supplying a static reference signal to the amplifier;
   a second circuit means responding to the means to represent wheel rotation as a voltage and supplying a wheel deceleration signal representative of the instantaneous rotation of the wheel to the first circuit means to produce the static reference signal therefrom for control of the integrating amplifier and the valve means;
   skid detector circuit means supplying a signal indicative of skid conditions of the wheel to the valve to override the control output signal; and
   a first logic circuit which, in response to a first external command signal, controls the ability of the wheel deceleration signal to effect the output of the first circuit means.

2. The brake control system according to claim 1 which further includes a second logic circuit, responsive to the first external command signal, operative to supply the output of the integrating amplifier to the valve means only when the first external command signal is present.

3. The brake control system according to claim 2 wherein the first logic circuit, in response to a second external command signal, controls the ability of the wheel deceleration signal to affect the output of the first circuit means when the first external command signal is present.

4. The brake control system according to claim 1 wherein the integration amplifier is such that the output thereof changes with respect to time at two separate and distinct rates depending upon the relative polarity between the static reference signal and a predetermined reference.

5. A brake control circuit for a rotating wheel which comprises:
   a brake for the wheel;
   wheel speed detector means to sense and indicate instantaneous wheel speed as an electrical signal;
   a skid detector actuated by the electrical signal from the wheel speed detector means so as to produce a first brake control signal; and
   means to control actuation of the brake by a second brake control signal which is characterized by an automatic brake circuit which includes:
   a deceleration comparator to receive the electrical signal from the wheel speed detector means, differentiate that signal, and compare the differentiated signal to a preset reference to produce a digital electrical error; and
   a deceleration modulator to receive and integrate the digital electrical error signal to produce the second brake control signal so as to supply it to the means to control actuation of the brake.

6. A circuit according to claim 5 wherein the modulator includes an amplifier combined with at least one resistor and a capacitor to form an integrator, with the values of the resistors and the capacitor controlling the characteristic output of the integrator, and means to limit the maximum output of the amplifier to prevent saturation thereof.

7. A circuit according to claim 6 which includes gate means acting as a series switch between the modulator and the means to control actuation of the brake, and means to externally control the gate means so as to selectively control inclusion of the automatic brake circuit into the brake control circuit.

8. A circuit according to claim 7 where the means to externally control the gate includes an apply-remove logic section which controls the operation of the gate in accordance with an apply signal and further controls a modulator in accordance with a remove signal coincident with the apply signal such that a smooth release of brake pressure may be achieved.

9. A circuit according to claim 8 which includes means to continuously apply a predetermined DC signal to the deceleration comparator so as to inhibit the output of the comparator from being affected by other signals applied thereto and means to remove the predetermined DC signal upon application of the apply signal.

10. A circuit according to claim 6 which includes means to control the integration rates of the modulator such that a negative rate of integration and positive rate of integration associated therewith are exclusively independent.

* * * * *